United States Patent

[11] 3,607,053

| [72] | Inventor | Victor J. Reilly<br>Memphis, Tenn. |
|---|---|---|
| [21] | Appl. No. | 747,112 |
| [22] | Filed | July 24, 1968 |
| [45] | Patented | Sept. 21, 1971 |
| [73] | Assignee | E. I. du Pont de Nemours and Company<br>Wilmington, Del. |

[54] STANNATE STABILIZER COMPOSITIONS CONTAINING ORTHOPHOSPHORIC ACID, THEIR PREPARATION, AND HYDROGEN PEROXIDE SOLUTIONS STABILIZED THEREWITH
12 Claims, No Drawings

[52] U.S. Cl..................................................... 23/207.5,
252/397
[51] Int. Cl................................................. C01b 15/02,
B01j 1/16
[50] Field of Search........................................ 23/207.5,
207, 397; 260/369

[56] References Cited
UNITED STATES PATENTS

| 1,958,204 | 5/1934 | Reichert.................. | 23/207.5 |
|---|---|---|---|
| 2,892,293 | 2/1959 | Roth, Jr................... | 23/207.5 |

FOREIGN PATENTS

| 642,845 | 6/1962 | Canada..................... | 23/207.5 |

Primary Examiner—Earl C. Thomas
Assistant Examiner—Hoke S. Miller
Attorney—Edwin B. Brading ABSTRACT: Aqueous stannate stabilizer compositions containing an alkali metal or ammonium stannate and orthophosphoric acid in an amount sufficient to adjust the pH of the composition to 6–11, a method for their preparation, and hydrogen peroxide solutions stabilized therewith. The stabilizer compositions are especially useful for stabilizing hydrogen peroxide solutions containing at least 30 percent $H_2O_2$ to provide stable products which remain exceptionally stable when diluted to strengths of 2–10 percent without further addition of any stabilizer.

STANNATE STABILIZER COMPOSITIONS CONTAINING ORTHOPHOSPHORIC ACID, THEIR PREPARATION, AND HYDROGEN PEROXIDE SOLUTIONS STABILIZED THEREWITH

BACKGROUND OF THE INVENTION

Most commercial hydrogen peroxide products are produced and sold initially as relatively high-strength solutions containing $H_2O_2$ at concentrations from 30-75 percent or higher. A substantial portion of such high-strength products are employed for a variety of uses for which it is customary to dilute the high-strength product to a substantially lower strength, e.g., 2-10 percent, at which it may then be stored for substantial periods of time before ultimate use. Peroxide solutions diluted in this manner are widely used for hair bleaching, in hair dyeing, as an agent in hair waving, as a mild antiseptic, etc. It is well known that dilute hydrogen peroxide solutions are inherently more difficult to stabilize against peroxide decomposition than are the more concentrated or high-strength solutions. Because of this, dilute solutions intended for storage prior to ultimate use have generally required special stabilizer formulations to provide satisfactory shelf life.

Most high-strength peroxide solutions are stabilized by the addition of stannate stabilizers. Although stannate stabilizers are highly effective, it has been customary and considered necessary to add supplementary stabilizers to such high-strength solutions when diluting to the customary 2-10 percent strengths normally employed for the uses indicated above. The most commonly used supplementary stabilizers are phenacetin (acetophenetidin) and acetanilide. The addition of such supplemental stabilizers represents an added processing step that the purchasers of the initial high-strength peroxide must carry out. In addition to that disadvantage, such supplemental stabilizers are attacked in time by the peroxide so that the diluted product tends to lose its stability during storage.

It has long been known that small amounts of impurities, especially heavy metal ions, actively catalyze the decomposition of hydrogen peroxide. It has also been known that stannates are highly effective stabilizers against such decomposition. Thus, Liebknecht et al. U.S. Pat. No. 1,213,921 proposed the use of precipitated stannic acid as a stabilizer; however, the soluble stannates, as proposed in Reichert U.S. Pat. No. 1,958,204, are generally more effective and have been widely used to stabilize acidic high strength hydrogen peroxide solutions of commerce.

The effectiveness of stannate stabilizers depends, to a considerable extent, upon the stannate stabilizer composition employed and the way in which it is prepared. The above Reichert patent discloses simply adding a sodium stannate solution to the peroxide, preferably along with a separately added solution of sodium pyrophosphate in order to prevent precipitation of tin compounds in the peroxide solution. The patent discloses that the effectiveness of the stannate solution can be improved somewhat by permitting it to age before use, which aging can be accelerated by heating. Baker U.S. Pat. No. 2,904,517 discloses stannate stabilizer compositions prepared by dissolving sodium stannate together with sodium pyrophosphate and ammonium nitrate in water and adjusting the pH of the resulting solution to an alkaline pH less than 9 in order to avoid formation of a permanent precipitate. Meeker U.S. Pat. No. 3,114,606 shows the stabilization of hydrogen peroxide solutions by the addition thereto of an aqueous solution of a soluble stannate and a tin complexing agent, which solution is acidified to a pH less than 5 before its use. Young U.S. Pat. No. 3,333,925 discloses a relatively complicated method for preparing a stannate stabilizer composition which contains both a sodium pyrophosphate and a sodium polymetaphosphate, $(NaPO_3)_x$, in certain proportions and has a pH of 5-8.

While the stabilizer compositions obtained by the methods of the above patents are fairly effective, the procedures for their preparation, in at least some instances, are fairly complex and the resulting compositions are not generally as effective as desired when the relatively high-strength solutions stabilized therewith are diluted to strengths on the order of 2-10 percent $H_2O_2$.

The present invention is based upon the discovery of a relatively simple method of preparing stannate stabilizer compositions which can be used to stabilize relatively high-strength peroxide solutions that can be diluted to yield low-strength solutions having outstanding stability without the addition of any supplemental stabilizer.

SUMMARY OF THE INVENTION

The stabilizer compositions of the invention consist essentially of aqueous solutions containing an alkali metal or ammonium stannate at a concentration, calculated as $Na_2SnO_3 \cdot 3H_2O$, of at least 0.5, e.g., 2 to 25, weight percent and sufficient orthophosphoric acid to impart to the composition a pH of 6-11, preferably 9-10.5.

Such stabilizer composition are prepared by forming an aqueous solution of an alkali metal or ammonium stannate at a concentration of at least 0.5 weight percent, calculated as $Na_2SnO_3 3H_2O$, and then adding orthophosphoric acid to the solution in an amount such that its pH will be adjusted to a value in the range 6 to 11, preferably 9-10.5.

The hydrogen peroxide solutions stabilized in accordance with the invention are acidic solutions to which have been added an amount of a stabilizer composition prepared as above as will provide in the peroxide solution at least 5, e.g., from 5 -2,000 mg. of stannate, calculated as $Na_2SnO_3 \cdot 3H_2O$, per liter of the solution.

DETAILED DESCRIPTION AND PREFERRED EMBODIMENTS

The stannate employed in preparing the stabilizer composition may be an alkali metal or ammonium stannate. The preferred stannate is sodium stannate. In the preparation of the compositions, the aqueous solution of the stannate should contain the stannate at a concentration of at least 0.5 percent, the preferred concentrations being 2-25 weight percent. However, higher concentrations up to the limit of solubility of the stannate can be employed. All stannate concentrations reported herein are calculated as $Na_2SnO_3 \cdot 3H_2O$. In order to complete the preparation of the stabilizer composition, the initial stannate solution should have its pH adjusted downwardly by the addition thereto of orthophosphoric acid ($H_3PO_4$) in an amount such as will result in a solution pH in the range 6 to 11. If the pH is adjusted to a value higher than 11, the resulting composition is much less effective as a stabilizer for hydrogen peroxide solutions, particularly after dilution of the stabilized solution to a peroxide concentration of from 2-10 percent by weight. Adjustment of the pH to 9-10.5 is particularly preferred since the resulting compositions are substantially more effective stabilizers than are those whose pH has been adjusted to higher or lower values.

While the stannate stabilizer compositions of the invention may be employed to stabilize any acidic hydrogen peroxide solution of any desired $H_2O_2$ concentration, they are especially effective for stabilizing higher strength solutions, e.g., solutions containing at least 30 weight percent $H_2O_2$, to provide stabilized products which can be diluted to lower strength products, especially solutions containing about 2-10 weight percent $H_2O_2$, having excellent stabilities. If no dilution of the originally stabilized peroxide solution is contemplated, the amount of the stabilizer composition added to the peroxide solution should provide in the peroxide solution a stannate concentration, calculated as $Na_2SnO_3 \cdot 3H_2O$, of at least 5 mg. per liter, although higher concentrations, e.g., at least 50 mg. per liter, generally will be preferred. Most generally, the stabilizer compositions will be employed for stabilizing high-strength peroxide solutions, e.g., solutions containing from 30-75 weight percent $H_2O_2$ or more, which solutions are intended to be diluted to low-strength solutions, e.g., 2-10 weight percent $H_2O_2$. For such purposes, the stabilizer composition preferably will be added to the high-strength peroxide solution in an amount to provide therein a stannate concentration, calculated as $Na_2SnO_3 \cdot 3H_2O$, of at least 100 mg. per liter and, most preferably, from 500–2,000 mg. per liter.

The stannate stabilizer compositions of the invention, their preparation, and their use in stabilizing hydrogen peroxide solutions, are illustrated in the following example in which all composition percentages are by weight. Deionized water was used in preparing all stannate solutions described and for effecting all dilutions indicated. All pH values reported were apparent values as determined by direct meter readings using a glass electrode.

In the following example, stabilities are shown for peroxide solutions after dilution and contamination. This is done to accentuate the differences in effectiveness of the various stabilizer systems. This is a useful measure, since one of the principal purposes of the stabilizer is to protect against accidental contamination of the peroxide solution. Since various metal ions have differing degrees of effect in catalyzing decomposition of the peroxide, a mixture of contaminants was used. The stabilities of all the uncontaminated solutions, before or after dilution, were good, being 0.3 percent loss of $H_2O_2$ per hour, or less, at 100° C.

EXAMPLE a. A freshly prepared 35 percent solution of hydrogen peroxide was stabilized in a conventional manner by the sequential addition thereto of 50 mg. $Na_4P_2O_7 \cdot 10H_2O$ and 100 mg. $Na_2SnO_3 \cdot 3H_2O$ per liter. As is customary practice, there also was added to the solution 20 mg. of ammonium nitrate per liter to protect against corrosion of aluminum by the solution in the event of chloride contamination, since aluminum containers are often used in the shipping and storage of hydrogen peroxide. The pH of the peroxide solution was then adjusted to 3.5 by the addition of orthophosphoric acid. As is conventional practice, when such a stabilized solution is diluted to strengths in the range 2–10 percent $H_2O_2$ for cosmetic or pharmaceutical use, a supplemental stabilizer was added. The hydrogen peroxide solution was diluted with water to a peroxide concentration of 6 percent. Then, to one part of the diluted peroxide solution there was added 2.6 grams of acetanilide while to the other part there was added a like amount of phenacetin per liter of the original 35 percent peroxide solution. Each solution was then contaminated by the addition thereto of ferric ammonium sulfate, potassium chromate, cupric sulfate, manganous sulfate and aluminum potassium sulfate, in amounts to provide in the solutions the following metal concentrations, in mg. per liter: Fe, 0.25; Cr, 0.012; Cu, 0.05; Mn, 0.025; and Al, 0.25. Following adjustment of the pH of the contaminated solutions to 4.3–4.4 by the addition of orthophosphoric acid, the stabilities of the contaminated diluted solutions were determined by observing the volume of oxygen released in samples of the solutions at 100° C. for periods up to 24 hours as a measure of the rate of peroxide decomposition. The rates of decomposition found, expressed as percent $H_2O_2$ lost per hour, are shown below:

| Supplemental Stabilizer ADDED | Average Rate, 1st 4 hours | Rate in 6th hr. |
| --- | --- | --- |
| Acetanilide | 0.8 | 2.7% |
| Phenacetin | 0.5% | 1.2% |

The above data show that with each of the supplemental stabilizers employed, the stability decreased with time, indicating attack by the peroxide on the organic stabilizer. Over long periods of storage, as commonly occurs on drug store selves, the stabilizing effect of such supplemental stabilizers is largely lost.

b. A quantity of freshly prepared unstabilized 35 percent hydrogen peroxide was stabilized by the sequential addition, first of 660 mg. of $Na_4P_2O_7 \cdot 10H_2O$, then 660 mg. of $Na_2SnO_3 \cdot 3H_2O$ per liter of the 35 percent $H_2O_2$. Twenty mg. of ammonium nitrate were also added and the pH of the resulting solution was then adjusted to 3.5 by the addition of orthophosphoric acid. The resulting stabilized solution was diluted to 6 percent with deionized water, then contaminated as indicated in part (a). After adjusting its ph to 4.3–4.4, the diluted solution was found to lose 0.75 percent of its hydrogen peroxide per hour at 100° C. When a freshly prepared 70 percent hydrogen peroxide solution was stabilized in a similar manner with 1,500 mg. per liter each of $Na_2SnO_3 \cdot 3H_2O$ and $Na_4P_2O_7 \cdot 10H_2O$, and 40 mg. of $NH_4NO_3$ per liter, then diluted and contaminated as above, its loss of $H_2O_2$ at 100° C. was found to be at a rate of 1 percent per hour. These results show that merely increasing the concentration of stannate and pyrophosphate in 35 or 70 percent hydrogen peroxide when stabilized by conventional methods, does not yield a diluted product of outstanding stability. This will be seen by comparing the results for this part (b) with those of part (c) below.

c. Thirty-five grams of $Na_2SnO_3 \cdot 3H_2O$ were dissolved in 1,000 grams of water. The resulting solution had a pH of about 12. Various stabilizer compositions were prepared by adding orthophosphoric acid to aliquots of the initial stannate solution, so as to obtain several stannate solutions having different pH values. Half of each stabilizer solution (referred to in the tabulation below simply as the "stabilizer") was then heated to 85–95° C. for 2 hours, while the remaining half of each was not heated. Each heated and unheated solution was added to a freshly prepared hydrogen peroxide solution containing 70 percent $H_2O_2$, the amount added being sufficient to provide in the peroxide solution 1,500 mg. $Na_2SnO_3 \cdot 3H_2O$ per liter. Ammonium nitrate was then added to each solution in the amount of 40 mg. per liter, and the resulting peroxide solutions were adjusted with orthophosphoric acid to a pH in the range 0.8–1.1. The resulting stabilized peroxide solutions were then diluted, contaminated and their pH adjusted to 4.3–4.4, as described in part (a) above, following which the stabilities of the contaminated solutions were determined. The results were as follows:

| | % $H_2O_2$ Lost/Hr. at 100° C. | |
| --- | --- | --- |
| pH of Stannate Stabilizer | Heated Stabilizer | Unheated Stabilizer |
| 10 | 0.08 | 0.15 |
| 9 | 0.08 | 0.15 |
| 8 | 0.14 | 0.20 |
| 7 | 0.18 | 0.18 |

The above very low peroxide decomposition rates demonstrate the high effectiveness of stabilizer compositions prepared according to the invention. Those stabilizer compositions whose pH was adjusted to a value in the range 9 to 10 were particularly outstanding, as is evident when the results obtained therewith are compared with those for the stabilizer compositions shown in parts (a) and (b) above. The above data also demonstrate a significant advantage resulting from preaging the stabilizer composition by heating, particularly for the stabilizer compositions whose pH values were above 8. Preaging the compositions before use can be effectively accomplished by storing them several, e.g., 2–10, days at ordinary temperatures. The preaging effect can be accelerated by heating, e.g., for ¼–2 hours, at a temperature of about 70° C. to the boiling point. Preaging by such heating is preferred.

The stabilities reported above for peroxide solutions stabilized in accordance with the invention are excellent stabilities considering the fact that the peroxide solutions tested were deliberately contaminated with a combination of heavy metal contaminants at concentrations known to be highly active in catalyzing decomposition of hydrogen peroxide.

The hydrogen peroxide solution that is stabilized in accordance with the invention should be acidic and generally should have a pH not higher than 6. The pH of a hydrogen peroxide solution will vary depending upon its $H_2O_2$ content and, as disclosed in Elston U.S. Pat. No. 2,497,814, the stability of a hydrogen peroxide solution is generally greatest at about that pH which represents its so-called equivalence point. Thus, the equivalence points, and the pH values of 30 percent, 50 percent and 70 percent $H_2O_2$ solutions at which they are most stable are, respectively, the apparent pH values of 4.0, 2.7 and 1.5, as determined by direct meter readings using a glass electrode. It is, therefore, preferred to adjust the pH of peroxide solutions stabilized in accordance with the invention, to a pH value which is not more than about 2 pH units either above or below the pH representing the equivalence point of the solution. For solutions containing at least 30 percent $H_2O_2$, e.g., 30–75 percent solutions, pH values not more than 1.5 units above or below the equivalence point are most preferred; but for more dilute solutions, particularly those containing from about 2–10 percent $H_2O_2$, it is most preferred that the pH be not higher than about 5, e.g., about 4 to 4.6, to insure against the pH becoming unduly high due to subsequent contamination with alkaline materials, particularly during storage in glass containers. Adjustment of the pH to values within the limits indicated, where necessary can be effected by the addition of any suitable acid such as nitric acid, sulfuric acid, orthophosphoric acid (preferred), lactic acid, citric acid or the like, or by the addition of any suitable alkaline material such as the alkali metal or ammonium hydroxides, carbonates or bicarbonates.

As will be seen from the above example, the stabilizer compositions of the invention can be prepared readily by a simple procedure and they can be employed to stabilize high-strength peroxide which can be diluted to low-strength products having excellent stabilities without requiring the use of any supplemental stabilizer. Furthermore, the stabilizing effectiveness of the stabilizer composition does not deteriorate in time in the presence of the peroxide solution which is being stabilized.

If the stannate stabilizer composition of the invention is to be used to stabilize a hydrogen peroxide solution that is to be stored or handled in aluminum containers or equipment, an alkali metal or ammonium nitrate can advantageously be added to the stabilizer composition to inhibit corrosion of the aluminum by the peroxide solution due to chloride impurities. However, the effectiveness of the stabilizer composition to stabilize peroxide against decomposition is not affected in any way by the presence of such a nitrate. Alternatively, the nitrate may be added separately to the peroxide solution if inhibition against aluminum corrosion is desired.

I claim:

1. The method of preparing a hydrogen peroxide stabilizer composition comprising providing an aqueous solution of an alkali metal or ammonium stannate containing at last 0.5 weight percent of said stannate, calculated as $Na_2SnO_3 \cdot 3H_2O$, and adding to said solution orthophosphoric acid in an amount such that the pH of said solution will be adjusted to a value within the range 9 to 10.5.

2. The method of claim 1 wherein the stannate is sodium stannate.

3. The method of claim 1 wherein the stannate solution contains 2 to 25 weight percent of the stannate.

4. The method of claim 1 wherein the stannate stabilizer composition is aged following the addition of orthophosphoric acid.

5. A stannate hydrogen peroxide stabilizer composition consisting essentially of an aqueous solution of an alkali metal or ammonium stannate containing at least 0.5 weight percent of said stannate, calculated as $Na_2SnO_3 \cdot 3H_2O$, and an amount of orthophosphoric acid to give a pH of 9 to 10.5.

6. The composition of claim 5 wherein the stannate is sodium stannate.

7. The composition of claim 5 wherein the solution contains 2 to 25 weight percent of the stannate.

8. The composition of claim 5 which has been aged.

9. An acidic aqueous hydrogen peroxide solution containing an alkali metal or ammonium stannate at a concentration calculated as $Na_2SnO_3 \cdot 3H_2O$, of at least 5 mg. per liter, said stannate having been supplied to said solution as a stannate stabilizer composition consisting essentially of an aqueous solution of an alkali metal or ammonium stannate containing at least 0.5 weight percent of said stannate, calculated as $Na_2SnO_3 \cdot 3H_2O$, and an amount of orthophosphoric acid to give to said stabilizer composition a pH of 9 to 10.5.

10. An acidic aqueous hydrogen peroxide solution according to claim 9, said solution having a pH not higher than 6 and not more than 2 pH units above or below that pH which represents the equivalence point of said solution, which solution contains an alkali metal or ammonium stannate at a concentration, calculated as $Na_2SnO_3 \cdot 3H_2O$, of at least 50 mg. per liter, said stannate having been supplied to said solution as a stannate stabilizer composition consisting essentially of an aqueous solution of an alkali metal or ammonium stannate containing at least 0.5 weight percent of said stannate, calculated as $Na_2SnO_3 \cdot 3H_2O$, and an amount of orthophosphoric acid to give to said stabilizer composition a pH of 9 to 10.5.

11. An acidic aqueous hydrogen peroxide solution according to claim 10, said solution containing at least 30 weight percent $H_2O_2$ and at least 100 mg. per liter of sodium stannate, calculated as $Na_2SnO_3 \cdot 3H_2O$, supplied to said solution as a stannate stabilizer composition consisting essentially of an aqueous solution of sodium stannate containing at least 0.5 weight percent of stannate, calculated as $Na_2SnO_3 \cdot 3H_2O$, and an amount of orthophosphoric acid to give to said stabilizer composition a pH of 9 10.5.

12. An acidic aqueous hydrogen peroxide solution according to claim 11, said solution containing 30 to 75 weight percent $H_2O_2$ and 500 to 2,000 mg. per liter of sodium stannate, calculated as $Na_2SnO_3 \cdot 3H_2O$, supplied to said solution as a stannate stabilizer composition consisting essentially of an aqueous solution of sodium stannate containing at least 0.5 weight percent of sodium stannate, calculated as $Na_2SnO_3 \cdot 3H_2O$, and an amount of orthophosphoric acid to give to said stabilizer composition a pH of 9 to 10.5.